United States Patent [19]

Shimaguchi

[11] Patent Number: 5,033,989
[45] Date of Patent: Jul. 23, 1991

[54] CONTINUOUSLY VARIABLE CHAIN TRANSMISSION AND LUBRICATING SYSTEM

[75] Inventor: Hiromichi Shimaguchi, Hamamatsu, Japan

[73] Assignee: Suzuki Jidosha Kogyo Kabushiki Kaisha, Shizuoka, Japan

[21] Appl. No.: 453,398

[22] Filed: Dec. 19, 1989

[30] Foreign Application Priority Data

Dec. 29, 1988 [JP] Japan .................. 63-332339

[51] Int. Cl.$^5$ ............................................. F16H 55/56
[52] U.S. Cl. .......................................... 474/8; 474/91; 474/43; 474/45; 184/11.5; 184/15.1
[58] Field of Search ............... 474/8, 25, 43, 44, 45, 474/52, 53, 77, 91, 93, 110, 116, 138; 74/457, 467; 184/6.26, 11.1, 11.3, 13.1, 15.1, 15.2, 15.3, 11.5

[56] References Cited

U.S. PATENT DOCUMENTS

| 1,771,346 | 7/1930 | Perry | 184/15.1 |
| 1,984,148 | 12/1934 | Morrish et al. | 184/15.1 |
| 2,620,897 | 12/1952 | Simpkin | 184/15.1 |
| 3,012,632 | 12/1961 | Bradley | 184/15.1 |
| 4,504,246 | 3/1985 | Mott | 474/8 |
| 4,582,170 | 4/1986 | Horiuchi | 74/467 |

FOREIGN PATENT DOCUMENTS

| 97958 | 6/1982 | Japan | 474/91 |
| 159468 | 8/1985 | Japan | 474/91 |
| 164068 | 8/1985 | Japan | 474/91 |
| 61-24753 | 7/1986 | Japan . | |

Primary Examiner—Ramon S. Britts
Assistant Examiner—Roger J. Schoeppel
Attorney, Agent, or Firm—Flynn, Thiel, Boutell & Tanis

[57] ABSTRACT

A non-stage automatic transmission for vehicles includes a pair of adjustable pulleys supported for rotation within a transmission casing, and an endless metal belt which is wound around and frictionally engaged with the pulleys for rotation therewith. A mechanism for supplying lubricating oil between the belt and the pulleys is provided, along with an arrangement for directing lubricating oil, which has been scattered from the belt onto the transmission casing, back toward the belt.

3 Claims, 4 Drawing Sheets

F I G. 2
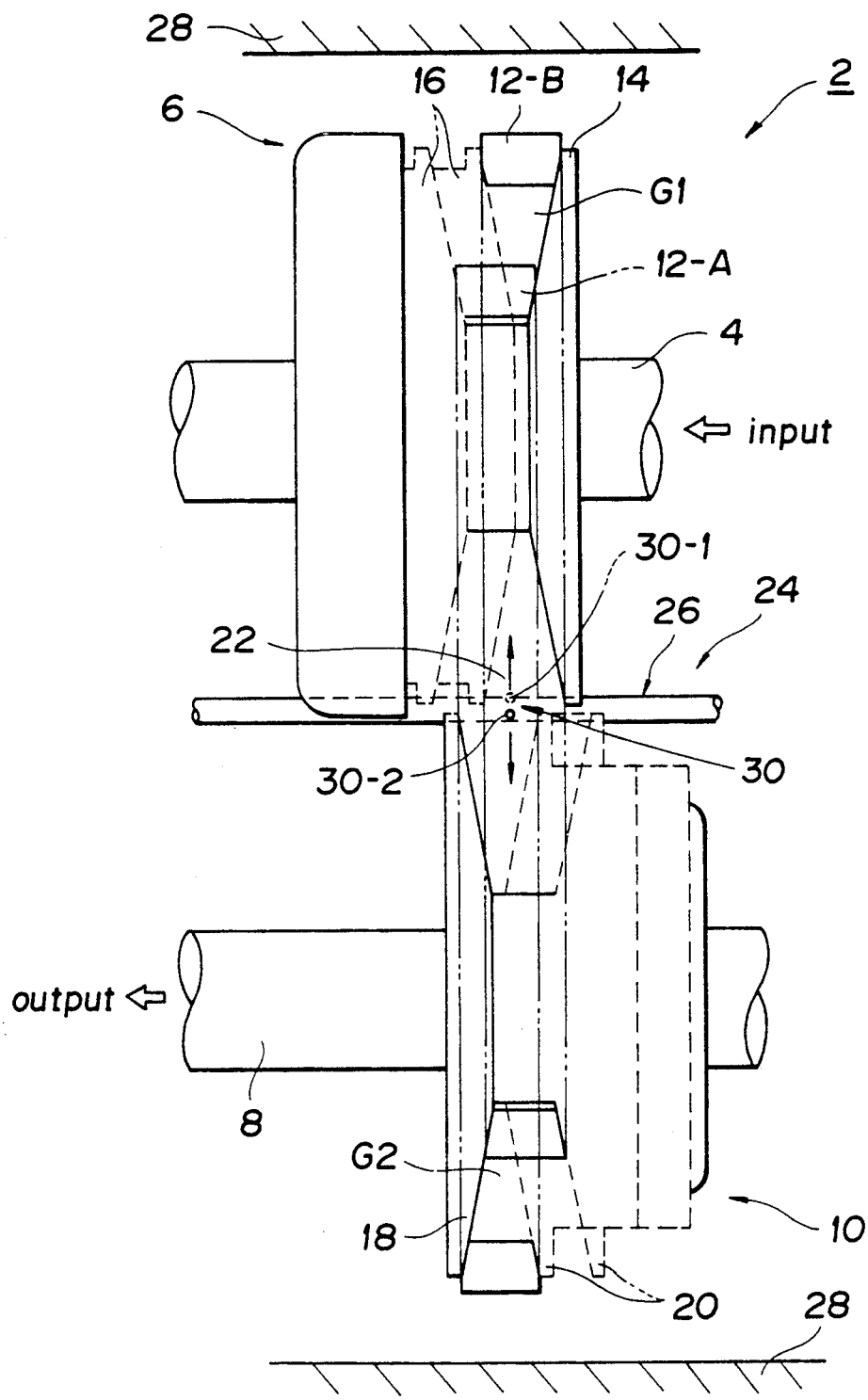

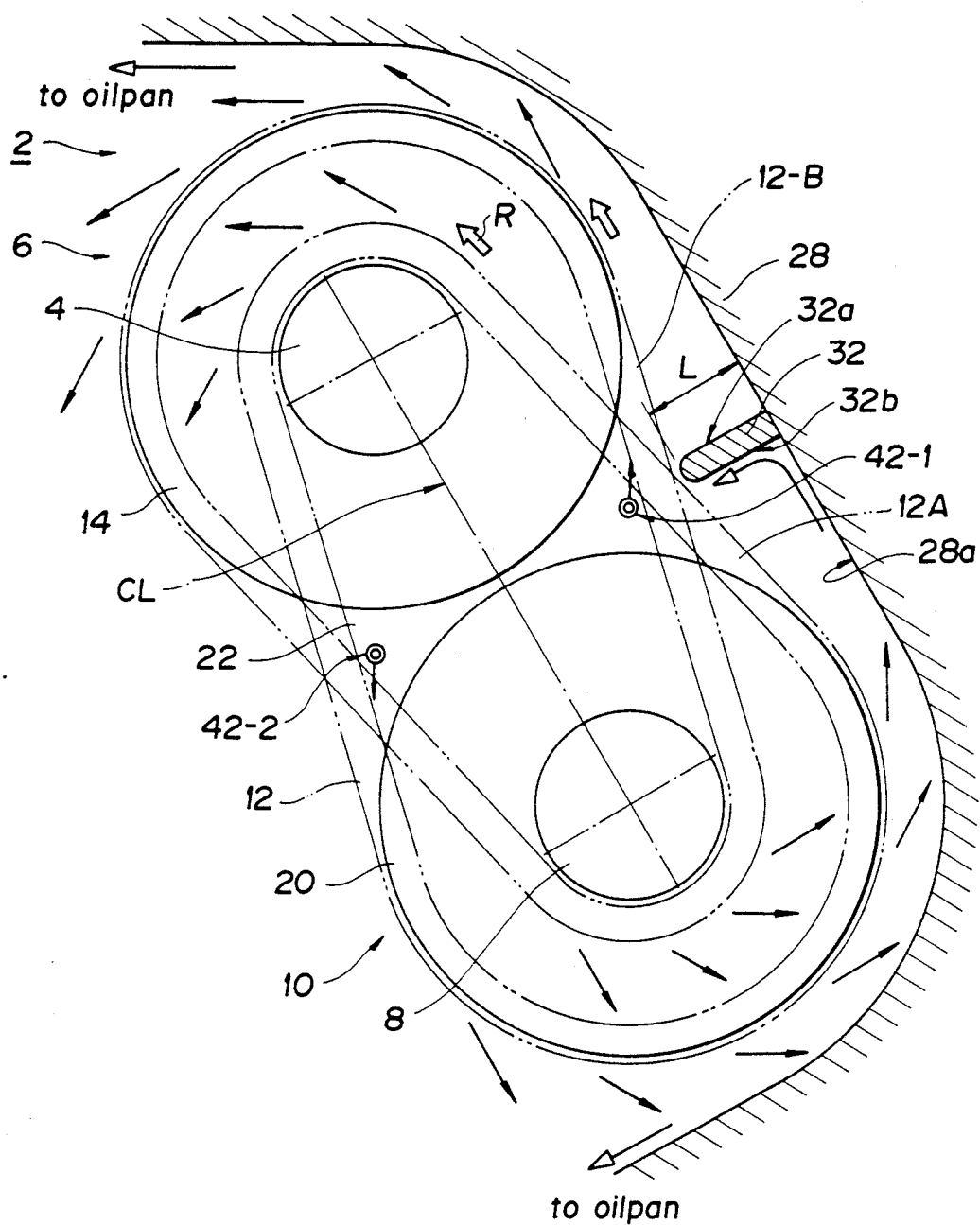

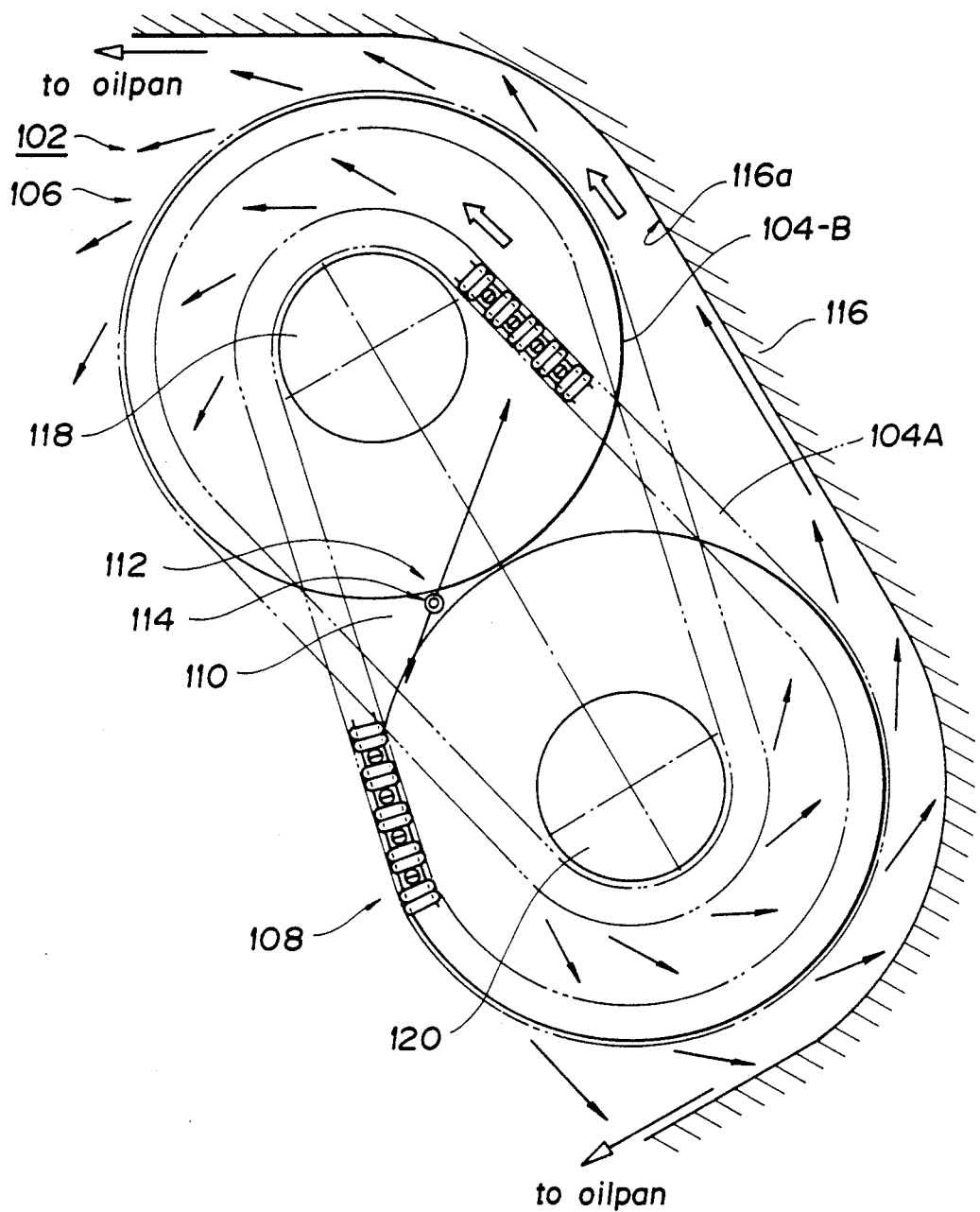

CONTINUOUSLY VARIABLE CHAIN TRANSMISSION AND LUBRICATING SYSTEM

FIELD OF THE INVENTION

The present invention relates to an automatic non-stage transmission for vehicles and, more particularly, to an automatic non-stage transmission for vehicles which can efficiently use a lubricating oil which is used to lubricate a metal belt.

BACKGROUND OF THE INVENTION

In a vehicle, a transmission is interposed between an internal combustion engine and drive wheels. In the transmission, driving force and running speed of the driving wheel are changed in accordance with the running conditions of the vehicle which change in a wide range, thereby allowing the performance of the internal combustion engine to be sufficiently effected. Among the transmissions, there is known an automatic non-stage transmission for vehicles having: a driving side adjustable pulley comprising a fixed pulley member which is fixed to a driving side shaft and a movable pulley member which is attached to the driving side shaft so as to be movable both toward and away from the fixed pulley member; a driven side adjustable pulley comprising a fixed pulley member which is fixed to a driven side shaft and a movable pulley member which is attached to the driven side shaft so as to be movable both toward and away from the associated fixed pulley member; and a belt reeved (wound) around the pulleys, wherein the width of respective grooves defined between the respective pairs of pulley members is decreased and increased and the rotating contact radius of the belt reeved around the pulleys is decreased and increased, thereby performing a variable speed control to achieve a change gear ratio.

Such an automatic non-stage transmission is disclosed in, for instance, JP-U-61-24753. According to the transmission disclosed therein, a drive shaft is formed as a hollow shaft, and the portion which rotates integrally with a torque converter or an engine of a fluid joint and an oil pump gear are coupled by an oil pump drive shaft which penetrates in the hollow portion of the drive shaft. An oil chamber in the central portion of the oil pump which is connected to a lock-up operation control circuit of a hydraulic pressure control unit and a lock-up clutch oil chamber in the torque converter or fluid joint are connected by an annular oil passage which is formed between the drive shaft hollow portion and the oil pump drive shaft. One end of the drive shaft faces the lock-up clutch oil chamber and the other end of the drive shaft faces the oil chamber of the oil pump. Therefore, the forces by the hydraulic pressures in both of the oil chambers which act on the drive shaft are always balanced so as not to generate a force in the shaft direction. Thus, there is no need to use a bearing of a large capacity in consideration of the force in the shaft direction. The non-stage transmission can be miniaturized and its weight is reduced.

In the automatic non-stage transmission using a metal belt which is reeved around the pulleys, since the motive power is transferred by the metal friction between the metal belt and the pulley members, a large force is applied to the metal belt. Therefore, a method and apparatus to supply an amount of lubricating oil is important. However, there is a case where the lubrication becomes improper or insufficient due to the path of the lubricating oil, the capacity of the oil pump, and the like.

That is, in the lubrication of the metal belt, it is important to positively supply the lubricating oil to the necessary portion of the belt. Since the metal belt is moved (rotated) while being reeved around the pulleys, the lubricating oil collides with the metal belt and is scattered and the supplying method of the lubricating oil is very difficult. Therefore, there is a case where the lubricating oil is supplied to the necessary portion of the belt by the oil pump through a thin nozzle at a predetermined pressure (ordinarily, a low pressure of 1 to 3 kg/cm$^2$). In this case, the lubricating oil is almost rectilinearly emitted from the nozzle for a predetermined distance and is applied to the necessary portion of the belt.

However, to emit the lubricating oil to the necessary belt portion, an oil pump of a large capacity is necessary, causing the size of the oil pump to become large. Also, there are inconveniences such that, due to the scattering described above, more lubricating oil than is needed is emitted from the nozzle and the work loss of the transmission increases.

On the other hand, after the pressurized lubricating oil collides with the rotating metal belt and is scattered by the centrifugal force, the lubricating oil is returned to the oil pan along the transmission casing and other internal parts, so that the lubricating oil is not effectively used.

In detail, as shown in FIG. 4, in an automatic non-stage transmission 102, a metal belt 104 rotates in moving direction (shown by arrows) and in the case of the maximum change gear ratio (full low), the rotating contact radius of the metal belt 104 decreases on the driving side pulley 106 and increases on the driven side pulley 108 (shown by a metal belt 104-A in FIG. 4). On the contrary, in the case of the minimum change gear ratio (overdrive), the rotating radius of the metal belt 104 increases on the pulley 106 and decreases on the pulley 108 (shown by a metal belt 104-B in FIG. 4). Even during backward movement of the vehicle, the metal belt 104 rotates in the same direction.

A lubricating oil pipe 114 constitutes a lubricating oil supplying means 112 and is arranged in a space 110 which is surrounded by pulley 106, pulley 108, and metal belt 104. The lubricating oil to the metal belt 104 is emitted from a discharge nozzle (not shown) formed in the lubricating oil pipe 114. The lubricating oil which collides with the rotating metal belt 104 is transferred along an inner surface 116a of a transmission casing 116 and other parts and is returned to an oil pan (not shown). As compared with the portion of the metal belt 104 on the side of pulley 108, the portion of the metal belt 104 on the side of pulley 106 is far away from the oil pipe 114 and thus the discharge nozzle. In addition, since the position of the metal belt 104 on the pulleys changes as mentioned above, the lubricating state becomes disadvantageous. Moreover, when the change gear ratio changes, since the metal belt moves in the shaft directions of the shafts 118 and 120, there is an inconvenience such that the lubricating state beCOmes unstable.

It is therefore an object of the invention to provide an automatic non-stage transmission for vehicles in which, in order to eliminate the foregoing inconveniences, lubricating oil which is scattered by the rotating metal belt and flows along the inner surface of the transmission casing is induced or directed to the side of the metal belt, so that even if a change gear ratio changes, the lubrication of the metal belt can be efficiently accomplished and the lubricating oil can be effectively used.

SUMMARY OF THE INVENTION

To accomplish the above object, the present invention provides an automatic non-stage transmission for vehicles having: a driving side adjustable pulley comprising a fixed pulley member which is fixed to a driving side shaft and a movable pulley member which is attached to the driving side shaft so as to be axially movable toward and away from the fixed pulley member; a driven side pulley comprising a fixed pulley member which is fixed to a driven side shaft and a movable pulley member which is attached to the driven side shaft so as to be axially movable both toward and away from the associated fixed pulley member; and a metal belt which is reeved around the pulleys, wherein the width of respective grooves defined between the respective pairs of pulley members is decreased and increased and the rotating contact radius of the metal belt is decreased and increased, thereby performing a variable speed control to change the gear ratio. The invention is characterized in that the transmission has a lubricating oil deflecting member for inducing or directing lubricating oil, which is scattered by the rotating metal belt and flows along the inner surface of a transmission casing, toward the metal belt.

According to the construction of the invention, when the metal belt reeved around the pulleys is rotating, the lubricating oil is supplied to the metal belt. The lubricating oil which is scattered by the rotating metal belt flows along the inner surface of the transmission casing and is induced or directed toward the metal belt by the lubricating oil deflecting member. Due to this, the scattered lubricating oil is again used to lubricate the metal belt, so that the lubricating oil is used effectively, and the metal belt can be efficiently lubricated.

BRIEF DESCRIPTION OF THE DRAWINGS

FIG. 2 is a left end view of the automatic non-stage transmission of FIG. 1;

FIG. 3 is generally similar to FIG. 1, but shows a second embodiment of the invention; and FIG. 4 is an explanatory diagram of a conventional automatic non-stage transmission.

DETAILED DESCRIPTION

Figure 1:
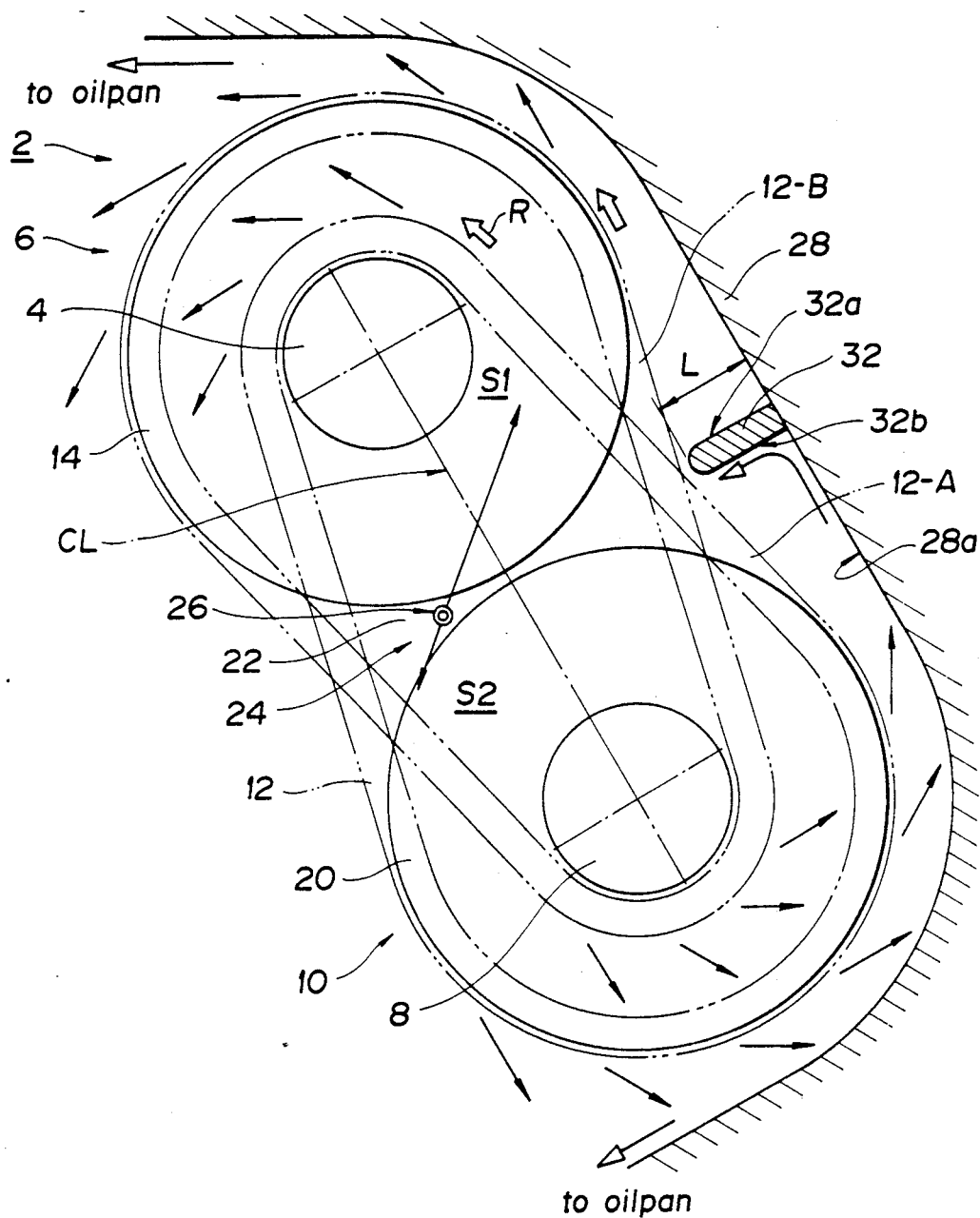
FIG. 1 is an explanatory diagram which illustrates how lubricating oil is supplied by the present invention to a space formed between a pair of pulleys, and a metal belt of an automatic non-stage transmission.

An embodiment of the present invention will be described in detail and practically hereinbelow on the basis of the drawings.

FIGS. 1 and 2 show the first embodiment of the invention. In the diagram, 2 denotes an automatic non-stage transmission for vehicles, 4 indicates a driving side shaft, 6 a driving side adjustable pulley, 8 a driven side shaft, and 10 a driven side adjustable pulley. An endless metal belt 12 (shown as 12-A and 12-B in respective positions) is reeved (wound) around a driving side groove G of the pulley 6 and a driven side groove $G_2$ of the pulley 10. The shaft 4 is coupled with an internal combustion engine (not shown). On the other hand, although not shown, a shaft and the like which are coupled to a clutch and wheels are coupled to the shaft 8.

The pulley 6 has: a fixed pulley member 14 which is fixed to the shaft 4; and a movable pulley member 16 which is nonrotatably attached to the shaft 4 so as to be rotatable therewith and reciprocally movable in the axial direction of the shaft 4. Hydraulic oil from an oil pump (not shown) is supplied to a driving side oil chamber (not shown). The movable pulley member 16 is moved axially by the oil pressure.

The pulley 10 has: a fixed pulley member 18 which is fixed to the shaft 8; and a movable pulley member 20 which is nonrotatably attached to the shaft 8 so as to be rotatable therewith and reciprocally movable in the axial direction of the shaft 8. Hydraulic oil is supplied to a driven side oil chamber (not shown). The movable pulley member 20 is moved axially by the oil pressure.

The grooves $G_1$ and $G_2$ are respectively defined between the pulley members 14 and 16, and the pulley members 18 and 20. Reciprocal movement of the movable pulley members 16 and 20 increases and decreases the respective widths of grooves $G_1$ and $G_2$, causing the respective contact radii of the belt 12 to change correspondingly, as shown by 12-A and 12-B in FIG. 1.

Lubricating oil supplying means 24 for supplying lubricating oil in the moving (rotating) direction R of the metal belt 12 is provided in a space portion 22 which is surrounded by the metal belt 12 and defined between the pulleys 6 and 10 (refer to FIG. 1). The lubricating oil supplying means 24 is directed in the shaft directions of the shafts 4 and 8 and comprises a lubricating oil pipe 26 which is suspended in the space 22. The lubricating oil pipe 26 is supported by a transmission casing 28.

A nozzle unit 30 to emit pressurized lubricating oil (which is fed from the oil pipe 26) in the moving direction R of the metal belt 12 is opened and formed in the lubricating oil pipe 26. That is, as shown in FIG. 1, the lubricating oil pipe 26 is located, for instance, slightly left of a center line CL through the centers of the shafts 4 and 8, preferably at a position where the lubricating oil can be most effectively supplied. Moreover, the nozzle unit 30 is located in a saddle portion of a line which is drawn by a straight line portion on the outside (or inside) of the metal belt 12. That is, the nozzle unit 30 is located adjacent the intersection of a pair of lines representing the belt positions 12-A and 12-B. On the side of the pulley 6, there is formed a first nozzle 30-1 to emit the lubricating oil in the moving direction R of the metal belt 12 and in a direction $S_1$ of the shaft 4. On the side of the pulley 10, there is formed a second nozzle 30-2 to emit the lubricating oil in the moving direction R of the metal belt 12 and in a direction $S_2$ of the shaft 8. In this embodiment, the first nozzle 30-1 and second nozzle 30-2 are formed so that their openings face in opposite directions.

The automatic non-stage transmission 2 is surrounded by the transmission casing 28. Oil which is scattered by the metal belt 12 flows along an inner surface 28a of the casing 28. The transmission casing 28 has a lubricating oil inductive member (or oil deflecting member) 32 comprising a partition member for directing or inducing the scattered oil flowing on the surface 28a toward the metal belt 12. The member 32 is cantilevered from surface 28a and projects inwardly toward the gap between the pulleys 6 and 10. In the embodiment, the lubricating oil inductive member 32 projects perpendicularly from the inner surface 28a and has a driving side oil inductive surface 32a facing the pulley 6 and a driven side oil inductive surface 32b facing the pulley 10, and has a predetermined length L. As shown in FIG. 1, the lubricating oil inductive member 32 is formed in the saddle portion of the line which is drawn by the straight line portion on the outside or inside of the fluctuating metal belt 12. That is, the member 32 is located adjacent the intersection of a pair of lines drawn along the belt positions 12-A and 12-B of FIG. 1. Due to this position of member 32, the position of that part of the metal belt 12 as disposed adjacent the end of member 32 is substantially fixed. The lubricating oil flowing along the inner surface 28a can be induced to the nearest position of the belt in a range where it does not interfere with the metal belt 12. The scattered oil is directed as close as possible to the belt 12 without the member 32 interfering with the belt, whether the belt is in position 12-A or 12-B.

The operation of this embodiment will now be described.

The driving force of the internal combustion engine is transferred to the pulley 6 through the shaft 4 and is transferred to the clutch and the like through the metal belt 12, pulley 10, and shaft 8.

At this time, in the case of the maximum change gear ratio (full low), the contact radius of the metal belt 12 decreases (due to an increase in the width of gap $G_1$) on the pulley 6 and the contact radius of the metal belt 12 increases (due to a decrease in the width of gap $G_2$) on the pulley 10 (shown by metal belt position 12-A in FIG. 1). On the contrary, in the case of the minimum change gear ratio (overdrive), the contact radius of the metal belt 12 increases on the pulley 6 and decreases on the pulley 10 (shown by metal belt position 12-B in FIG. 1). That is, in the automatic non-stage transmission 2, the contact radius of the metal belt 12 is decreased and increased by the pulleys 6 and 10, thereby changing the gear ratio. Due to this, the variable speed control is executed and the motive power of the internal combustion engine is transferred to the clutch and the like.

As mentioned above, when the automatic non-stage transmission 2 is driving, the lubricating oil which was fed with pressure into the lubricating oil pipe 26 is emitted from the first nozzle 30-1 toward the pulley 6 and is emitted from the second nozzle 30-2 toward the pulley 10. At this time, the lubricating oil from the first nozzle 30-1 is emitted in the moving direction R of the metal belt 12 toward the shaft 4 and supplied between the shaft 4 and the metal belt 12. The lubricating oil from the second nozzle 30-2 is emitted in the moving direction R of the metal belt 12 toward the shaft and supplied between the shaft 8 and the metal belt 12.

Therefore, the lubricating oil from the lubricating oil pipe 26 is all supplied to the space 22 which is formed by the metal belt 12 and the pulleys 6 and 10. Thus, the lubricating oil for the metal belt 12 is positively supplied to a desired position by only a predetermined amount. A proper frictional coefficient is assured, the metal friction is made proper, and the motive power of the internal combustion engine can be preferably transferred.

In the case of the minimum change gear ratio (overdrive position 12-B), the rotation of the pulley 10 becomes fast and the lubricating oil is immediately scattered to the outside of the metal belt 12. However, lubricating oil which is scattered by the metal belt 12 and flows along the inner surface 28a on the side of the pulley 10 is directed from the inner surface 28a along the surface 32b and is supplied near the metal belt 12 in the space 22 between the pulleys. Due to this, the scattered lubricating oil can be used again and the lubricating oil can be effectively used. The metal belt 12 can be efficiently lubricated.

On the other hand, in the automatic non-stage transmission 2, since the clutch and the like are provided on the shaft 8, the metal belt 12 moves in the same direction R irrespective of the forward and backward movements of the vehicle, so that the lubricating oil which is supplied from the lubricating oil pipe 26 is always effectively applied to the belt, thus avoiding a reduction of the amount of lubricating oil applied to the belt. It is economically advantageous.

Further, according to the construction of the embodiment, since the lubricating oil is supplied from the optimum position and the lubricating oil is efficiently used, the capacity of the oil pump can be reduced and the oil pump can be miniaturized.

Moreover, the lubricating oil can be supplied by a simple, easily assembled construction, and the costs become low.

On the other hand, even when the metal belt 12 is moved axially of the shafts 4 and 8, the lubricating oil can be automatically supplied to the position of the metal belt 12 and stable lubrication can be performed. Even if the change gear ratio changes, the metal belt 12 can be certainly lubricated.

Further, since the lubricating oil inductive member 32 is arranged at the position nearest to the metal belt 12, almost all of the scattered lubricating oil can be used again to lubricate the metal belt 12, which is practically advantageous.

FIG. 3 shows the second embodiment of the invention. In this embodiment, the parts having the same functions as those in the first embodiment are designated by the same reference numerals.

It is a feature of the second embodiment that lubricating oil pipes 42-1 and 42-2 are arranged within and near the metal belt 12 on the sides of and between the pulleys 6 and 10 at positions spaced oppositely from the center line CL, and discharge nozzles (not shown) are respectively formed in the lubricating oil pipes 42-1 and 42-2 so as to emit the lubricating oil toward the metal belt 12 as indicated by the arrows in FIG. 3.

According to the construction of the second embodiment, in the case of the forced lubrication of the metal belt 12 in a state in which the lubricating oil was forcedly emitted from the nozzles, the effective lubrication can be accomplished. Thus, the lubricating oil amount can be reduced, the capacity of the oil pump can be further reduced, and the oil pump can be further miniaturized.

On the other hand, since substantially all of the lubricating oil is supplied from the nozzles directly to the metal belt 12, the lubricating effect on the metal belt 12 can be increased.

In addition, the number of nozzles which are formed in the lubricating oil pipe can be increased in accordance with necessity.

As will be obvious from the above detailed description, according to the invention, by providing the lubricating oil inductive member for inducing to the metal belt side the lubricating oil which is scattered by the rotating metal belt and flows along the inner surface of the transmission casing, even if the change gear ratio changes, a proper amount of lubricating oil can be supplied to a proper position, the lubrication can be efficiently executed, the lubricating oil can be effectively used, and the size of the oil pump can be reduced.

Although a particular preferred embodiment of the invention has been disclosed in detail for illustrative purposes, it will be recognized that variations or modifications of the disclosed apparatus, including the rearrangement arrangement of parts, lie within the scope of the present invention.

The embodiments of the invention in which an exclusive property or privilege is claimed are defined as follows:

1. In an automatic non-stage transmission for vehicles having: a driving side adjustable first pulley comprising a fixed pulley member which is fixed to a driving side shaft and a movable pulley member which is attached to said driving side shaft so as to be reciprocally movable toward and away from the fixed pulley member; a driven side adjustable second pulley comprising a fixed pulley member which is fixed to a driven side shaft and a movable pulley member which is attached to said driven side shaft so as to be reciprocally movable toward and away from the fixed pulley member; and a metal belt which is reeved around the driving side first pulley and the driven side second pulley, wherein respective grooves are defined between respective pairs of said pulley members, each of said grooves having a width which is decreasable and increasable to vary a contact radius of the metal belt with each of said pulleys to thereby execute a variable speed control to change a gear ratio, the contact radius of said first and second pulleys being respectively increased and decreased or respectively decreased and increased to change the gear ratio, said pulleys being housed in a transmission casing, the improvement comprising lubricating oil deflecting means supported on said transmission casing for directing lubricating oil, which is scattered by the rotating metal belt and which flows along an inner surface of said transmission casing, directly and immediately back onto said metal belt, said deflecting means projecting inwardly in cantilevered relation from said inner surface toward said metal belt and toward the gap between said pulleys, said deflecting means terminating in a free end disposed directly adjacent a spatial location through which said metal belt always passes irrespective of the disposed contact radii of the pulleys, said location being disposed generally midway between said first and second pulleys and displaced transversely to one side of a centerline which perpendicularly intersects said driving and driven shafts.

2. A transmission according to claim 1, including a pair of oil supply pipes located interiorly of the metal belt within the gap between said pulleys, said pipes being disposed closely adjacent the inner surface of the metal belt and on opposite sides of said centerline, each said pipe having nozzle means for permitting discharge of lubricating oil from the pipe onto the belt generally in the direction of belt movement.

3. A continuously variable transmission for vehicles, comprising:
a pair of adjustable diameter pulleys respectively nonrotatably mounted on parallel rotatable shafts which are spaced from each other and supported for rotation within a transmission casing, an endless metal belt wound around said pulleys, said belt being engaged with said pulleys for rotation therewith, means for supplying lubricating oil to said belt at a location between said belt and said pulleys, and oil flow guiding means provided on an inner surface of said transmission casing for guiding lubricating oil, as scattered away from said belt onto said inner surface, from said inner surface immediately and directly back onto said belt, said oil flow guiding means including a deflection member which projects substantially perpendicularly from said inner surface of said transmission casing toward said metal belt, said deflection member having a free end and a length which is defined between said inner surface and said free end, said belt being spaced from said inner surface in the vicinity of said deflection member, said spacing between said belt and said inner surface in the vicinity of said deflection member being only slightly greater than said length of said deflection member, said deflection member projecting from a location on said inner surface which is substantially midway between said spaced shafts and transversely spaced from a centerline which perpendicularly intersects said shafts, said belt extending between said pulleys closely adjacent said free end of said deflection member, and said oil supplying means including a pair of oil supply pipes located approximately midway between said shafts and being generally parallel thereto, said pipes being substantially equally spaced on opposite sides of said centerline and being located closely adjacent and inside of said belt, each said pipe including nozzle means for permitting discharge of lubricating oil from said pipe onto said belt and generally in the direction of rotation of said belt.

* * * * *

UNITED STATES PATENT AND TRADEMARK OFFICE
CERTIFICATE OF CORRECTION

PATENT NO. : 5 033 989

DATED : July 23, 1991

INVENTOR(S) : Hiromichi Shimaguchi

It is certified that error appears in the above-identified patent and that said Letters Patent is hereby corrected as shown below:

Column 7, line 43; change "disposed contact" to
---adjusted contact---.

Signed and Sealed this

Sixteenth Day of March, 1993

Attest:

STEPHEN G. KUNIN

*Attesting Officer*     *Acting Commissioner of Patents and Trademarks*